(No Model.) 2 Sheets—Sheet 1.

W. M. PIATT.
SHOCK BINDING AND EJECTING MECHANISM FOR CORN HARVESTERS.

No. 588,469. Patented Aug. 17, 1897.

Witnesses.
Marguerite Piatt,
Julia K. Piatt

Inventor.
William M. Piatt (No Model.) 2 Sheets—Sheet 2.
W. M. PIATT.
SHOCK BINDING AND EJECTING MECHANISM FOR CORN HARVESTERS.
No. 588,469. Patented Aug. 17, 1897.
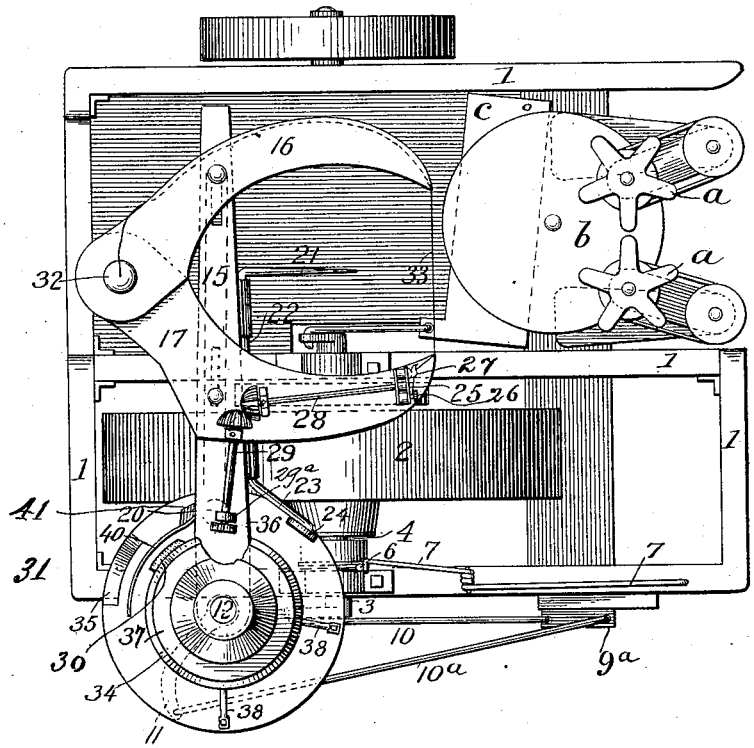
Fig. 3.
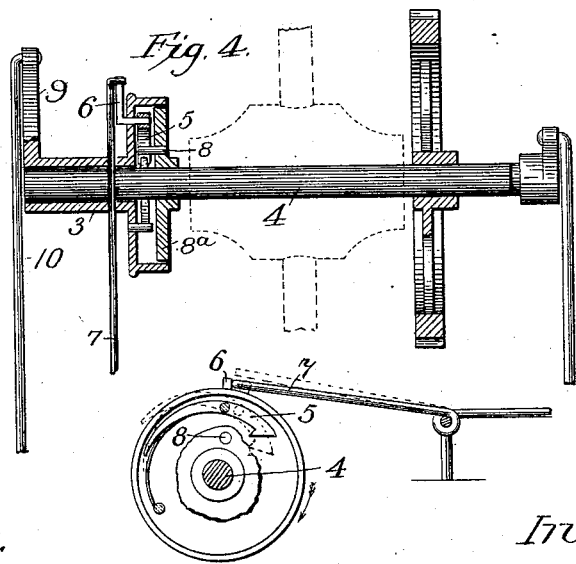
Fig. 4.
Fig. 5.
Witnesses.
Marguerite Piatt,
Julia K. Piatt.
Inventor.
William M. Piatt

UNITED STATES PATENT OFFICE.

WILLIAM M. PIATT, OF WEST LIBERTY, OHIO.

SHOCK BINDING AND EJECTING MECHANISM FOR CORN-HARVESTERS.

SPECIFICATION forming part of Letters Patent No. 588,469, dated August 17, 1897.

Application filed May 31, 1895. Serial No. 551,180. (No model.)

*To all whom it may concern:*

Be it known that I, WILLIAM M. PIATT, a citizen of the United States, residing at West Liberty, in the county of Logan and State of Ohio, have invented certain new and useful Improvements in Shock Binding and Ejecting Mechanism for Corn-Harvesters; and I do hereby declare that the following is a full, clear, and exact description of the invention, which will enable others skilled in the art to which it appertains to make and use the same.

This invention relates to shock-ejecting mechanism for corn-harvesters; and it has for its object to provide simple and improved means for conveniently and effectively lifting the shock, carrying it out from the machine, and depositing it upon the ground.

My improvements are adapted for corn-harvesters of various types, but are especially designed and adapted for that class of corn-harvesters which retain the cornstalks in a standing vertical position.

My invention is further designed in discharging or ejecting the shocks to lift the shock and carry it outwardly in a segment of a circle and then deposit it upon the ground at a point nearly in rear of the main drive-wheel or beyond the line of travel of the drive-wheel, thus providing a clear road for the team and harvester in successively passing said point.

Figure 1:
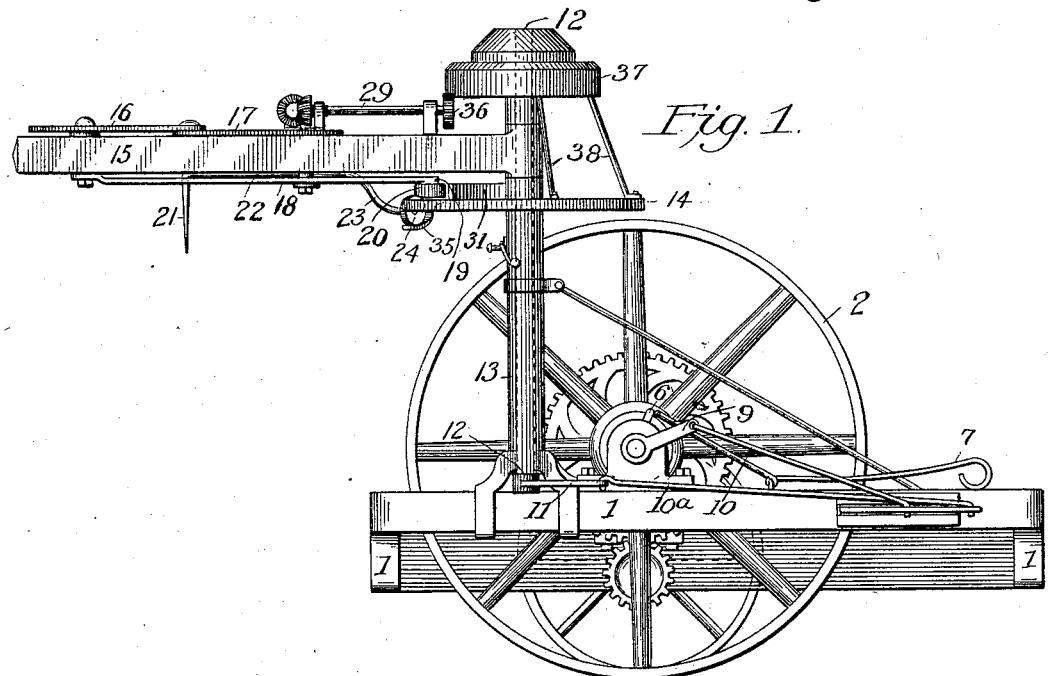
Figure 2:
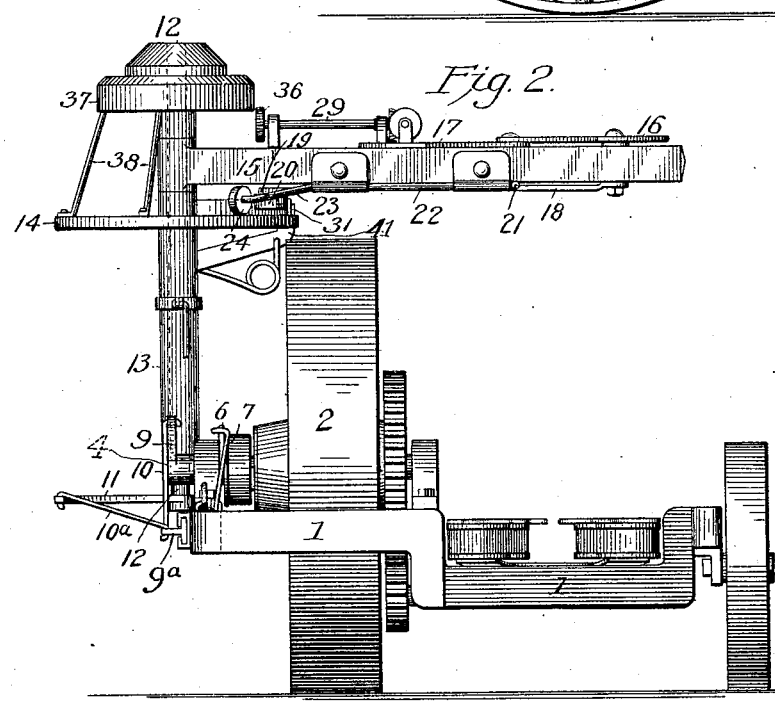

In the drawings, Figure 1 is a side elevation of part of a corn-harvester having my improved mechanism. Fig. 2 is a front end elevation of the same. Fig. 3 is a top or plan view. Fig. 4 is a vertical section through the clutch on the main wheel-axle. Fig. 5 is a section on the line 5 5 of Fig. 4, a portion of the disk fixed to the axle being broken away.

In the construction and arrangement of my invention I provide a cam-stand mounted upon the main sill or frame commonly employed in harvesting-machines, this stand being arranged in proximity to the main drive-wheel and securely fixed in position. Supported by and journaled to this cam-stand is the shock-carrying arm with its actuating-shaft, connection between said shaft and the drive-wheel being made by means of a clutch-hub journaled upon the axle of the main drive-wheel and provided with a wrist or projecting crank-arm, to which is attached a connecting rod or pitman extending to a crank-arm upon the bottom of the upright shaft of the shock-carrying arm. The clutch-hub is loosely mounted upon the outer end of the axle of the main drive-wheel and carries a pivoted dog or pawl, which is normally held and controlled by a trip-lever conveniently mounted upon the harvester-frame. When the pawl is released by the operation of this lever, it is adapted to drop within the path traveled by a pin or stud projecting laterally from a disk fixed to the axle of the main drive-wheel, thus forming a clutch engagement between the main drive-wheel and the clutch-hub which operates the shaft of the shock-carrying arm. The arrangement is such that when the trip-lever has been returned to its normal position during the revolution of the main drive-wheel it will engage the heel of the pawl as the latter comes around and will disengage the pawl from the said projecting stud or pin, thus permitting operation of the main drive-wheel without actuation of the shock-ejecting mechanism.

Referring to the drawings, 1 designates the sill of the harvester, and 2 the main drive-wheel.

3 designates the clutch-hub, which is loosely mounted upon the axle 4 of the main drive-wheel and carries the pivoted pawl or dog 5, having a laterally-projecting crank-arm 6, adapted to strike the end of an angular trip-lever 7, fulcrumed upon the sill or frame of the harvester, during the rotation of the clutch-hub 3.

8 designates the lateral pin or stud, projecting from a disk $8^a$, fixed to the axle of the main drive-wheel. Projecting from the clutch-hub 3 is a wrist or crank 9, connected by a pitman or connecting rod 10 to a slide $9^a$, the slide $9^a$ being connected by a rod $10^a$ with a crank 11 at the bottom of the upright shaft 12 of the shock-carrying arm.

13 designates the upright frame or standard, which is secured upon the sill 1, adjacent to the main drive-wheel, and serves as a bearing for the shaft 12 and a rigid support for the horizontal cam-stand 14.

15 designates a shock-carrying arm having at its outer end the finger 16, journaled on a sliding pivot, and near its inner end the pivoted knotter arm or finger 17. The fingers 16 and 17 are pivoted together at their rear ends.

18 designates a finger-compressing rod which is slotted and slidingly mounted on the pivot of the arm 17, on the under side of the arm 15, and pivotally connected to the finger 16 at its outer end. The inner end 19 of the rod 18 is at a right angle to the main portion and carries a wheel or roller 20, pivoted on a vertical axis.

21 designates the rock-shaft finger projecting from the outer end of the rock-shaft 22, which is mounted in bearings upon the shock-carrying arm 15 and is provided at its inner end with an arm 23, extending horizontally at an angle to the rock-shaft and carrying a friction-roller 24.

The finger 16 forms the needle, and upon the knotter arm or finger 17 is mounted the knotter 25, the gripper 26, the twine-cutter 27, and the geared shaft 28 for actuating the knotter, gripper, and knife, this knotting mechanism being, in the main, of any suitable or adapted construction. The shaft 28 meshes at its rear end with and is operated by a geared shaft 29, the latter shaft being operated by a skew-rack 30, carried by a cap-piece 37, supported by braces 38, provided upon the cam-stand 14, so that the cap-piece overhangs the arm 15, and the rack 30 engages a gear 36 upon the shaft 29. Shaft 29 is journaled in a pivoted bearing on the arm 17 and is held against longitudinal movement therein, but is adapted to slide in the pivoted bearing on the arm 15, which carries its other end.

31 designates a cam-switch, by which, through the medium of the rod 18, the needle-arm 16 and the knotter-arm 17 are actuated.

35 is a depressed portion of the track on which the roller 24 of the rock-shaft 22 travels.

41 is a pivoted spring-pressed switch normally projecting up through an opening in the stand 14.

The twine-box 32 is preferably mounted upon and at the rear of the shock-carrying arm 15 and from it extends the twine 33, through the needle 16, to the knotter mechanism upon the knotter-arm 17.

When the cornstalks have been gathered and assembled and formed into an upright shock and the latter is ready for binding and ejecting, the trip-lever 7 is operated to release the pawl or dog 5 and the latter engages with the pin or studs 8 on the hub of the main drive-wheel, thus causing the clutch-hub 3 to revolve. The crank-arm 9 then carries the pitman or connecting rod 10 forward, thus swinging the crank-arm 11 outward and turning the shaft 12, which causes the shock-carrying arm 15 to swing outwardly. The rod 18, by reason of the shape of the cam-track 31, in which its wheel or roller 20 travels, draws the fingers 16 and 17 together, so that they embrace the top portion of the shock. The rock-shaft finger 21 has during the operation of the mechanism pierced the top of the shock, and the latter will be carried around in the segment of a circle and in rear of the main drive-wheel. In this operation the crank 9 will have performed nearly half a single revolution and the wheel 20 will have reached the end of the switch-track 31, when the wheel will run off the track and the rod 18 release the fingers 16 and 17. The rock-shaft finger 21, then supporting the shock, is allowed to swing down and the shock is dropped vertically to the ground. The dropping of the rock-shaft finger 21 is effected by reason of the rock-shaft roller or wheel 24 running off a depressed part or switch-track 35 upon the cam-stand.

In the operation of tying and knotting the shock the fingers 16 and 17 are brought together in such a way that the twine will be carried to the knotting mechanism mounted upon the finger or arm 17. In the movement of the carrying-arm 15 the pinions or gear 36 upon the shaft 29, which is carried by the arm 15, is brought into engagement with the segmental skew-rack 30, whereby the knotting mechanism is actuated through the connecting-shaft 28 and operates in the usual well-known manner.

It will be noted that the wheel or roller 20 of the rod 18 travels in the cam or switch track 31 and is guided by said cam during the outward swing of the rod 18. The wheel or roller 20 returns to its normal position outside of the switch-track, a pivoted switch 41 acting to guide the wheel 20 inwardly and switch it onto the track 31 and yielding to permit it to come into position for another operation.

The switch 41 is supported by an arm pivoted to the stock of the cam-stand 14. The switch has no connection with the roller 24, being on an inner plane between the outer track of roller 24 and the guide-tracks for roller 20. The pivot-switch 41 extends up through a trap or break in the table of the cam-stand 14. The switch-front that roller 20 acts against is like a latch. It is a square shoulder and will not yield, and by the vertical inclined face of the switch 41 roller 20 is switched inwardly onto the guide-track. On the return of roller 20 it engages the rear side of switch 41, which side is inclined from the perpendicular, and by the yielding of the spring-pressed arm the switch is depressed and allows the roller 20 to pass over it in obedience to the movement of the shock-supporting arm 15 and its connecting mechanism.

The tying is accomplished by the fingers 16 and 17 having been drawn together by their controlling mechanism, and the finger 16, carrying the cord or band material, presents the same to the knotting mechanism, which is mounted upon the forward portion of finger 17 and is of one of the well-known patterns of knotter, preferably the Appleby, or of my knotter, patented June 5, 1888, No. 384,072. The form of Appleby knotter employed may be seen in the Piatt, No. 367,441, patented August 2, 1887, Fig. 9, and in the Piatt No. 374,267, patented December 6, 1887, Figs. XI and XII. In this new construction I employ a spur-gear instead of the rack in the figures cited. The knotter is actuated by and through the medium of the following mechanism: Shock-supporting arm 15 is swung laterally by its controlling mechanism and in this movement brings the pinion spur-gear on shaft 29 in engagement with the skew-rack 30. This gives shaft 29 one revolution, which in turn, through the spherical gears connecting shafts 28 and 29, revolves shaft 28 one revolution and by spur-gear shaft 28 revolves the knotter one revolution and the gripper a section of a revolution. The knot is tied in the usual and well-known manner.

Now to go back to the gears on shafts 28 and 29 and connecting same. Shaft 28 is journaled to finger 17 in stationary-box journal. 29 is journaled in a pivot-box 29$^a$ to finger 17. This box encircles shaft 29 just at the hub of its respective spherical gear-wheel. The box 29$^a$ is pivoted to finger 17 beneath the center part of the cogs of the gears uniting shafts 28 and 29. The point 29$^a$, as indicated in accompanying drawings, Fig. 3, designates the pivotal point, which will at all times keep the cogs in mesh relation, no matter at which angle the movement of finger 17 may throw them. Pivoted box 29$^b$, which controls the spur feathered wheel 36, is pivoted as indicated in Fig. 3.

Reference being had to the cutter, gatherers, and reciprocating packer, $a$ designates gathering-reels, $b$ a rotary cutter, and $c$ a reciprocating packer connected by a pitman to a crank-shaft driven from the main wheel. Further description of this construction is omitted, inasmuch as it forms subject-matter fully set forth and claimed in my Patent No. 565,026, dated August 4, 1896. With reference to skew-rack 30 and gear-wheel 36 for actuating the knotter mechanism it will be observed that when the fingers or arms 16 and 17 are brought together through their actuating mechanism the shaft 29, in sympathy with said movement through its pivotal connection to arm 17, is drawn oblique and endwise. Gear 36 partakes of this movement and is moved from its normal position onto the path which leads gear 36 to engage with skew-rack 30 during the outward swing of the shock-carrying arm 15. Now it will be supposed that arm 15 having reached its extreme outward travel the arms 16 and 17 are released through their respective controlling mechanisms. Shaft 29 recedes and its gears partake of its endwise movement. Gear 36 is carried by the return home movement of arm 15 on a path paralleling its outward movement, but so far removed as not to engage skew-rack 30. The return-path of gear 36 describes a segment of a circle between the line of skew-rack 30 and shaft 12.

I claim—

1. An improved shock-ejecting mechanism comprising the cam-stand, the shock-carrying arm and its actuating-shaft, the fingers pivotally mounted upon said shock-carrying arm, said fingers pivoted together at their rear ends and one of them mounted to slide on said arm, the rod pivotally connected to the outer finger and carrying a wheel or roller at its inner end and a track upon the cam-stand guiding the movement of said roller, substantially as and for the purpose set forth.

2. An improved shock-ejecting mechanism comprising the cam-stand, the carrying-arm and its actuating-shaft, the fingers pivotally mounted upon said arm, said fingers pivoted together at their rear ends and one of said fingers mounted to slide on said arm, the rod pivotally connected to said slidingly-mounted finger and provided at its inner end with a wheel or roller and the guide-track upon the cam-stand embodying the return-track and the pivoted switch substantially as and for the purpose set forth.

3. An improved shock-ejecting mechanism comprising the cam-stand mounted upon an upright or frame, the carrying-arm having its actuating-shaft journaled in the cam-stand or upright frame and provided at its lower end with a crank-arm, means connected with said crank-arm for operating the shaft, the fingers pivotally mounted upon said carrying-arm, said fingers pivoted together at their rear ends, one of them mounted to slide on the carrying-arm, the rod pivotally connected to said slidingly-mounted finger and provided at its inner end with a wheel or roller, and a guide-track upon the cam-stand for controlling the operation of said rod, substantially as and for the purpose set forth.

4. A shock-ejecting mechanism comprising the cam-stand, the shock-carrying arm and its actuating-shaft, the rock-shaft mounted upon said arm and provided with the projecting end finger and having a crank provided with a wheel or roller at its inner end and a segmental track upon the cam-stand for controlling the operation of the rock-shaft, substantially as and for the purpose set forth.

5. A shock-ejecting mechanism comprising the cam-stand, the shock-carrying arm and its actuating-shaft, the fingers mounted upon said arm, said fingers hinged together at their rear ends, the inner finger pivotally mounted and the outer finger slidingly mounted upon said arm, the rod pivotally connected to the outer one of said fingers and provided at its inner end with a wheel or roller, a track upon the cam-stand controlling the operation of said rod, the rock-shaft mounted upon the carrying-arm and provided with the projecting end finger, and at its cranked inner end with a wheel or roller, and a segmental track upon the cam-stand controlling the operation of said shaft, substantially as set forth.

6. A shock-ejecting mechanism comprising the cam-stand, the shock-carrying arm having its actuating-shaft provided at its bottom end with a crank-arm by which the shaft is operated, the fingers mounted upon said arm, said fingers hinged at their rear ends—the inner finger pivotally mounted and the outer finger slidingly mounted upon said arm, the rod pivotally connected to the outer finger and provided at its inner end with a wheel or roller, the track upon the cam-stand controlling the operation of the said rod and embodying the return-track and the pivoted switch, the rock-shaft mounted upon the shock-carrying arm and having the projecting end finger and the angular inner end carrying a friction wheel or roller, and the segmental track upon the cam-stand for controlling the operation of the rock-shaft substantially as and for the purpose set forth.

7. An improved shock-ejecting mechanism comprising the cam-stand mounted adjacent to the drive-wheel, the shock-carrying arm having the actuating-shaft provided with the crank-arm at its lower end, the fingers mounted upon said arm, said fingers hinged at their rear ends, the inner finger pivotally mounted and the outer finger slidingly mounted upon said arm, the rod pivotally connected to the outer one of said fingers, guide devices upon the cam-stand for controlling the operation of said rod, a clutch-hub loosely mounted upon the shaft of the drive-wheel and carrying the pawl or dog and a crank-arm, the drive-wheel having a projecting pin or stud adapted to be engaged by said pawl, means for retaining the pawl from engaging with said projecting pin and a pitman connection from the crank of the clutch-hub to the crank of the actuating-shaft of the shock-carrying arm substantially as and for the purpose set forth.

8. A shock-ejecting mechanism comprising the cam-stand mounted adjacent to the drive-wheel, the shock-carrying arm having the actuating-shaft provided at its lower end with the crank-arm, the fingers mounted upon the shock-carrying arm, said fingers hinged together at their rear ends, the inner finger pivotally mounted and the outer finger slidingly mounted upon said arm, the rod pivotally connected to the outer finger and provided at its inner end with a wheel or roller, a guide-track upon the cam-stand for controlling the operation of said rod, the clutch-hub loosely mounted upon the shaft of the drive-wheel and provided with a pawl or dog and with a crank on its end, the drive-wheel having the projecting pin or stud adapted to be engaged by said pawl, a trip-lever bearing upon the pawl and adapted to retain the same from engagement with the projecting stud or pin and a pitman connection from the crank end of the clutch-hub to the crank end of the actuating-shaft of the shock-carrying arm substantially as and for the purpose set forth.

9. An improved shock-ejecting mechanism comprising a cam-stand, the shock-carrying arm having its actuating-shaft provided with a crank at one end, the fingers mounted upon said arm, said fingers hinged together at their rear ends, the inner finger pivotally mounted and the outer finger slidingly mounted upon said arm, the rod pivotally connected to the outer one of said fingers, guide devices upon the cam-stand engaging said rod and controlling its operation, the drive-wheel and intermediate mechanism for transmitting the motion of the drive-wheel to the crank of the actuating-shaft of the shock-carrying arm substantially as and for the purpose set forth.

10. In a shock-ejecting mechanism of the class described comprising the cam-stand the shock-carrying arm the fingers pivotally mounted upon said arm and means for operating said fingers, the knotter mechanism mounted upon the inner finger and embodying a shaft meshing with a shaft carried upon the shock-carrying arm and devices upon the cam-stand for operating the latter shaft during the movement of the shock-carrying arm substantially as and for the purpose set forth.

11. In a shock-ejecting mechanism of the class described comprising the cam-stand, the shock-carrying arm, the fingers pivotally mounted upon said arm and means for operating said fingers the knotter mechanism mounted upon the inner finger and embodying a shaft meshing with a shaft carried by the shock-carrying arm, the pinion or gear upon the latter shaft, and a segmental gear mounted upon the cam-stand and engaging said pinion during the movement of the shock-carrying arm, substantially as and for the purpose set forth.

12. An improved mechanism of the class described comprising the cam-stand, the shock-carrying arm and its actuating-shaft, the fingers pivotally mounted upon said arm—said fingers pivoted together at their rear ends, the rod pivotally connected to the outer one of said fingers and provided at its inner end with a wheel or roller a track upon the cam-stand for guiding the operation of said rod—said rod made to slide endwise with said finger sliding on said arm, the knotter mechanism mounted upon the inner finger and embodying a shaft meshing with a shaft carried by the shock-carrying arm, a pinion or gear upon the latter shaft and a segmental gear carried by the cam-stand and meshing with said pinion during the operation of the shock-carrying arm—substantially as set forth.

13. An improved mechanism of the class described comprising the cam-stand the shock-carrying arm and its actuating-shaft, the fingers pivotally mounted upon said arm, the outer finger made to slide on said arm, the rod pivotally connected to said finger, guide means upon the cam-stand engaging said rod and controlling its operation, the rock-shaft mounted upon said arm and provided with the end finger, devices upon the cam-stand engaging said rock-shaft and controlling its operation, the knotter mechanism mounted upon the inner finger and engaging actuating mechanism carried by the shock-carrying arm, and devices upon the cam-stand for operating said mechanism carried by the shock-carrying arm—substantially as set forth.

14. An improved mechanism of the class described comprising the cam-stand, the shock-carrying arm provided with the actuating-shaft, the fingers pivotally mounted upon said arm—said fingers pivoted together at their rear ends—the outer finger made to slide on said arm the rod pivotally connected to said outer finger and provided at its inner end with a wheel or roller, the guide-track upon the cam-stand for controlling the operation of said rod, the rock-shaft mounted upon the shock-carrying arm and having the projecting finger and cranked inner end, the segmental track upon the cam-stand engaging the inner end of the rock-shaft and controlling the operation of the latter, the knotter mechanism mounted upon the inner finger and embodying a shaft meshing with a shaft upon the shock-carrying arm, a gear or pinion upon the latter shaft and a segmental gear carried by the cam-stand and adapted to engage said pinion during the movement of the shock-carrying arm—substantially as and for the purpose set forth.

15. In a mechanism of the class embodying a swinging shock-carrying arm, having the pivoted fingers, the knotter mechanism carried upon one of said fingers and connected with operating mechanism upon said shock-carrying arm, and means for actuating said mechanism upon the said shock-carrying arm during the lateral movement of said arm substantially as set forth.

In testimony whereof I affix my signature in presence of two witnesses.

WILLIAM M. PIATT.

Witnesses:
 DON C. BAILEY,
 GEO. F. BAILEY.